(12) United States Patent
Robbins et al.

(10) Patent No.: US 11,349,684 B2
(45) Date of Patent: May 31, 2022

(54) UTILITY VEHICLE CONTROL SYSTEM WITH REAL TIME CLOCK

(71) Applicant: Club Car LLC, Evans, GA (US)

(72) Inventors: John Eldon Robbins, Evans, GA (US); Todd P. Steele, Martinez, GA (US); Bruce Joseph Tenerowicz, North Augusta, SC (US)

(73) Assignee: CLUB CAR, LLC, Evans, GA (US)

( * ) Notice: Subject to any disclaimer, the term of this patent is extended or adjusted under 35 U.S.C. 154(b) by 134 days.

(21) Appl. No.: 16/695,963

(22) Filed: Nov. 26, 2019

(65) Prior Publication Data

US 2020/0177411 A1 Jun. 4, 2020

Related U.S. Application Data

(60) Provisional application No. 62/773,017, filed on Nov. 29, 2018.

(51) Int. Cl.
| | |
|---|---|
| *H04L 12/40* | (2006.01) |
| *B60L 53/60* | (2019.01) |
| *B60R 16/023* | (2006.01) |
| *G07C 5/00* | (2006.01) |
| *G07C 5/02* | (2006.01) |
| *G07C 5/08* | (2006.01) |

(52) U.S. Cl.
CPC ........ *H04L 12/40013* (2013.01); *B60L 53/60* (2019.02); *B60R 16/023* (2013.01); *G07C 5/008* (2013.01); *G07C 5/02* (2013.01); *G07C 5/085* (2013.01); *B60L 2200/24* (2013.01); *H04L 2012/40273* (2013.01)

(58) Field of Classification Search
USPC .......................................................... 701/22
See application file for complete search history.

(56) References Cited

U.S. PATENT DOCUMENTS

| | | | |
|---|---|---|---|
| 2010/0087981 A1* | 4/2010 | Orozco-Perez | H04L 67/18 701/29.5 |
| 2010/0106351 A1* | 4/2010 | Hanssen | B60K 6/48 701/22 |
| 2010/0168945 A1* | 7/2010 | Ohno | B60L 3/0038 701/22 |
| 2011/0208953 A1* | 8/2011 | Solomon | B60L 3/00 713/2 |
| 2014/0074320 A1* | 3/2014 | Nishida | B60L 53/305 701/2 |

(Continued)

*Primary Examiner* — Tyler D Paige
(74) *Attorney, Agent, or Firm* — Edell, Shapiro & Finnan, LLC (57) ABSTRACT

A utility vehicle that includes a vehicle control system having one or more real time clocks (RTC). The RTC can be embedded in the vehicle control system, or in components or subsystems of the vehicle control system, and can be either dedicated electronics or software based. Information provided by the RTC can be used to synchronize components and subsystems of the vehicle control system. Further, such inclusion of the RTC can enable the vehicle control system to initiate a number of time based functions, including, for example, time based functions relating to battery charging, wake-up and shut down of components, status reporting, periodic vehicle level events and maintenance, and management of time based operation or use of the utility vehicle or components thereof, including vehicle cameras.

20 Claims, 8 Drawing Sheets

(56) References Cited

U.S. PATENT DOCUMENTS

| | | | |
|---|---|---|---|
| 2014/0316671 A1* | 10/2014 | Okamoto | G08G 1/22 |
| | | | 701/96 |
| 2018/0357870 A1* | 12/2018 | Siminoff | G08B 13/19606 |
| 2020/0101850 A1* | 4/2020 | Harty | B60L 58/13 |
| 2020/0177411 A1* | 6/2020 | Robbins | G07C 5/085 |

* cited by examiner

UTILITY VEHICLE CONTROL SYSTEM WITH REAL TIME CLOCK

BACKGROUND

Embodiments of the present application generally relate to utility vehicle control systems. More particularly, but not exclusively, embodiments of the present application relate to utility vehicle control systems that include one or more real time clocks.

Utility vehicles can be used for a variety of personal and commercial purposes. Accordingly, utility vehicles can be design to have a wide range of functionalities. Given the scope of different functionalities, certain components or subsystems within the utility vehicle may operate generally independently of other functionalities. Moreover, traditionally, there can be a lack of synchronization between such components or subsystems in at least control systems of such utility vehicles. Accordingly, there remains a need for further contributions in this area of technology.

BRIEF SUMMARY

One embodiment of the present application is a unique vehicle control system for a utility vehicle that includes a real time clock. Other embodiments include apparatuses, systems, devices, hardware, methods, and combinations for synchronizing the subsystem or components of a vehicle control system of a utility vehicle. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
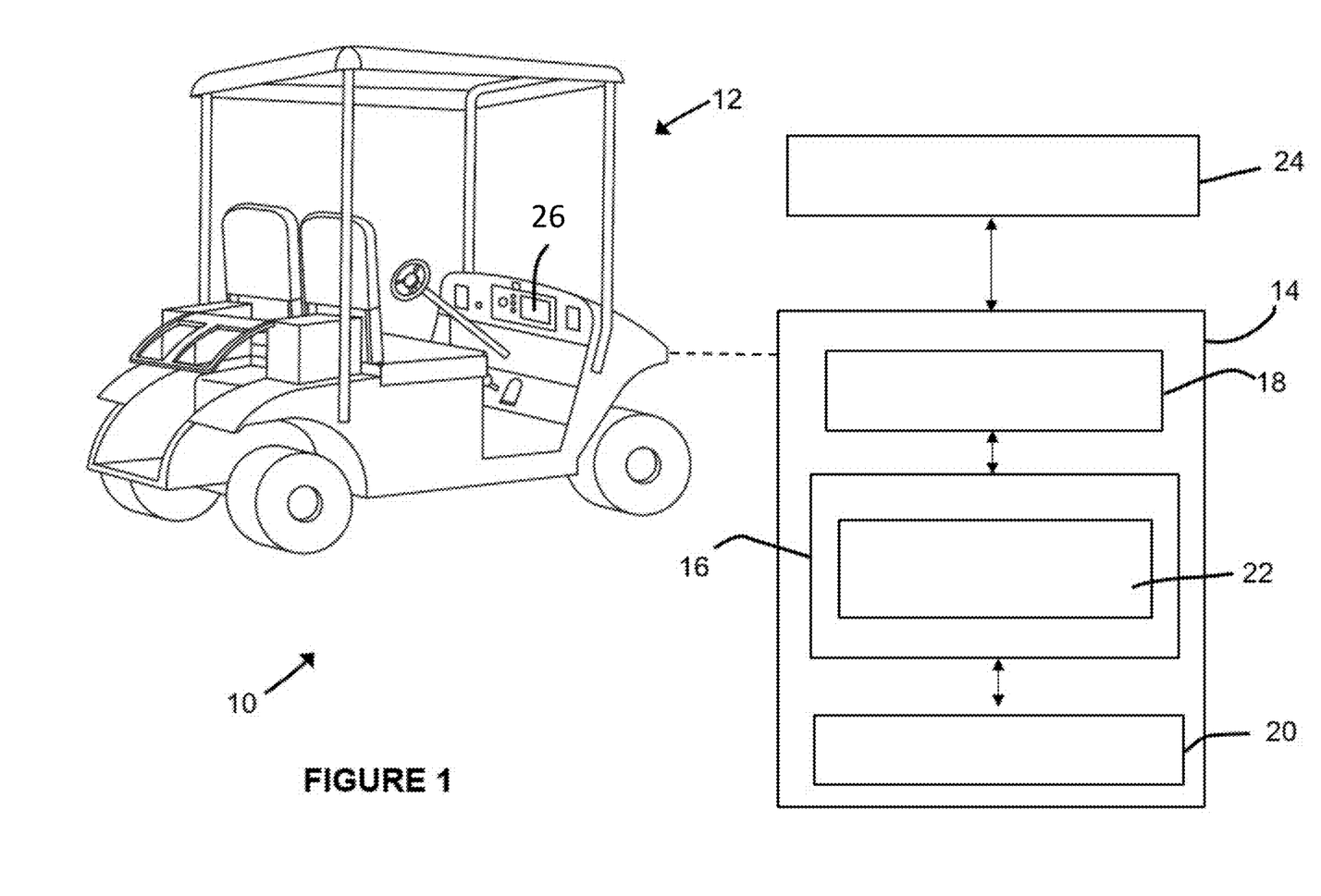
FIG. 1 illustrates a schematic representation of an exemplary vehicle system according to an illustrated embodiment of the subject application.

FIG. 1 illustrates a schematic representation of an exemplary vehicle system 10 according to an illustrated embodiment of the subject application. As illustrated, the exemplary vehicle system 10 can include a utility vehicle 12 having an associated vehicle control system 14. A variety of different types of vehicles can be used as the utility vehicle 12. Further, the utility vehicle 12 can be a motorized vehicle, such as, for example, a vehicle that is motorized or otherwise powered via use of electrical power, batteries, internal combustion engines, renewal energy sources, and/or combinations thereof, in addition to other manners of motorization. In one particular form, the utility vehicle 12 includes a lithium ion battery pack that is structured to provide electrical power used to power a motor of the utility vehicle 12 that provides a driving force for movement of the utility vehicle 12 and/or which provides electrical power for one or more electrical devices of the utility vehicle 12. Further, the utility vehicle 12 can be adapted for a variety of different types of applications and/or uses. For example, according to certain embodiments, the utility vehicle 12 is a motorized golf car or cart. Alternatively, or additionally, according to other embodiments, the utility vehicle 12 is a fully autonomous vehicle, relatively small all-terrain utility vehicle, a neighborhood vehicle, or any other similarly classed light utility passenger vehicle. Accordingly, it will be understood that descriptions found herein that mention "utility vehicle" are not to be construed as limited, but rather can be applied more broadly as set forth herein.

The vehicle control system 14, which can be positioned within and/or around the utility vehicle 12, can utilize a variety of different types of hardware and/or software. Additionally, the vehicle control system 14 can be configured to execute a variety of different computer based applications, including, for example, at least those discussed below and illustrated with respect to FIGS. 2-6. Additionally, according to certain embodiments, the vehicle control system 14 can execute or otherwise rely upon various computer software applications, components, programs, objects, modules, and/or data structures. Moreover, various applications, components, programs, objects, and/or modules, can be executed on one or more processors of the vehicle control system 14, or in another device or web-server network that is coupled to the vehicle control system 14.

According to the exemplary embodiment depicted in FIG. 1, the vehicle control system 14 includes a processing device 16, an input/output device 18, a memory 20, and an operating logic 22. Furthermore, as illustrated, the vehicle control system 14 can communicate with one or more external devices 24, as discussed below. The input/output device 18 can be any type of device that allows the vehicle control system 14 to communicate with the external device 24 and/or to otherwise receive/communicate instructions and/or information. For example, according to certain embodiments, the input/output device 18 can be a network adapter, network card, or a port (e.g., a USB port, serial port, parallel port, VGA, DVI, HDMI, FireWire, CAT 5, or any other type of port). The input/output device 18 can be comprised of hardware, software, and/or firmware. It is contemplated that the input/output device 18 includes more than one of these adapters, cards, or ports. Additionally, according to certain embodiments, the vehicle control system 14 can include, or otherwise be coupled to, one or more transceivers that are configured for communication with external devices 24, including, for example, via use of one or more wireless protocols or data streams, among other communication protocols.

The external device 24 can be any type of device that allows data to be inputted or outputted from the vehicle control system 14. To set forth just a few non-limiting examples, the external device 24 can be a handheld device, another computer, a server, a printer, a display, an alarm, an illuminated indicator, a keyboard, a mouse, a mouse button, or a touch screen display. Furthermore, it is contemplated that, according to certain embodiments, the external device 24 can be integrated into the vehicle control system 14. For example, the vehicle control system 14 can be a smartphone, a laptop computer, or a tablet computer. Additionally, according to certain embodiments, the display of the external device 24, if any, may or may not be integrated with the vehicle control system 14 as one unit, which can be consistent with the general design of certain external devices 24, such as, for example, smartphones, laptop computers, tablet computers, and the like. It is further contemplated that there can be more than one external device in communication with the vehicle control system 14.

The processing device 16 can be of a programmable type, a dedicated, hardwired state machine, or a combination of these, and can further include multiple processors, Arithmetic-Logic Units (ALUs), Central Processing Units (CPUs), or the like. For forms of processing devices 16 with multiple processing units, distributed, pipelined, and/or parallel processing can be utilized as appropriate. The processing device 16 can be dedicated to performance of just the operations described herein, or can be utilized in one or more additional applications. In the depicted form, the processing device 16 is of a programmable variety that executes algorithms and processes data in accordance with the operating logic 22 as defined by programming instructions (such as software or firmware) stored in the memory 20. Alternatively or additionally, the operating logic 22 for the processing device 16 is at least partially defined by hardwired logic or other hardware. The processing device 16 can be comprised of one or more components of any type suitable to process signals received from the input/output device 18, the external device 24, or elsewhere, as well as provide desired output signals. Such components can include digital circuitry, analog circuitry, or a combination of both.

The memory 20 can be of one or more types, such as a solid-state variety, electromagnetic variety, optical variety, or a combination of these forms. According to certain embodiments, the memory 20 can represent a random access memory (RAM) device, supplemental levels of memory (e.g., cache memories, non-volatile or backup memories (e.g., programmable or flash memories)), read-only memories, or combinations thereof. Further, the memory 20 can be volatile, nonvolatile, or a mixture of these types, and some or all of the memory 20 can be of a portable variety, such as a disk, tape, memory stick, cartridge, or the like. Additionally, the memory 20 can store data that is manipulated by the operating logic 22 of the processing device 16, such as data representative of signals received from and/or sent to the input/output device 18 in addition to or in lieu of storing programming instructions defining the operating logic 22, just to name one example. As shown in FIG. 1, according to certain embodiments, the memory 20 can be included with the processing device 16 and/or coupled to the processing device 16. The memory 20 can store a variety of data, including, for example, at least data related to setting controls of one or more utility vehicles 12, among other data. In addition to the memory 20, the vehicle system 10 can include other memory located elsewhere in the vehicle system 10, such as cache memory in a CPU of an external device 24, as well as any storage capacity used as a virtual memory (e.g., as stored on a storage device or on another computer coupled to the vehicle system 10).

The external device 24 can have one or more similar characteristics of the vehicle control system 14 that is described above. No limitation is intended to confine the external device 24 to any particular type of device. Data from the external device 24 can be provided to the vehicle control system 14 using any variety of techniques. For example, data can be transmitted over a wired or wireless link, and/or a memory module (e.g. USB stick) can be removed from the external device 24 and connected to a vehicle control system 14. A combination of two or more of the above-mentioned techniques of conveying information from the external device 24 to the vehicle control system 14 are contemplated herein.

According to certain embodiments, the utility vehicle 12 can be configured to communicate information externally over external devices 24 that include one or more networks. The one or more networks can each include, or be in operable communication with, one or more computer networks, such as, for example, a local area network (LAN) including wireless LAN (i.e., Wi-Fi), a wide area network (WAN), a cellular network (e.g., 3G, 4G Long-Term Evolution (LTE), 5G, etc.), and/or the Internet, among other networks that are configured to send and/or receive data.

In the exemplary embodiment illustrated in FIG. 1, the utility vehicle 12 can include, or have operably coupled thereto, a navigation and positioning system (NPS), which can also be referred to as a telematics system and/or a respective telematics system(s). For example, according to certain embodiments, the NPS is a global position system (GPS) device that is mounted external to the utility vehicle 12, and/or an electronic horizon device that is connected to the utility vehicle 12. According to such embodiments, the NPS can be electronically connected to the vehicle control system 14 for the purpose of providing, and/or receiving information, including, for example, geographic location data, among other data. Further, according to certain embodiments, other additional information can be can be transmitted to/from the NPS and the vehicle control system 14.

In the illustrated embodiment of FIG. 1, the vehicle control system 14 can also be connected to a display 26, as such as, for example, a display 26 that is positioned for viewing by a user or operator of the utility vehicle 12. In certain embodiments, the display 26 can be a visual display computer unit (e.g., a monitor, a liquid crystal display (LCD) panel, organic light emitting diode (OLED) display panel, among others) such as a touch screen interactive display, that can display a variety of information, including, for example, information that is updated in real-time regarding the current location of the utility vehicle 12, as well as information pertaining to other utility vehicles.

Figure 2:
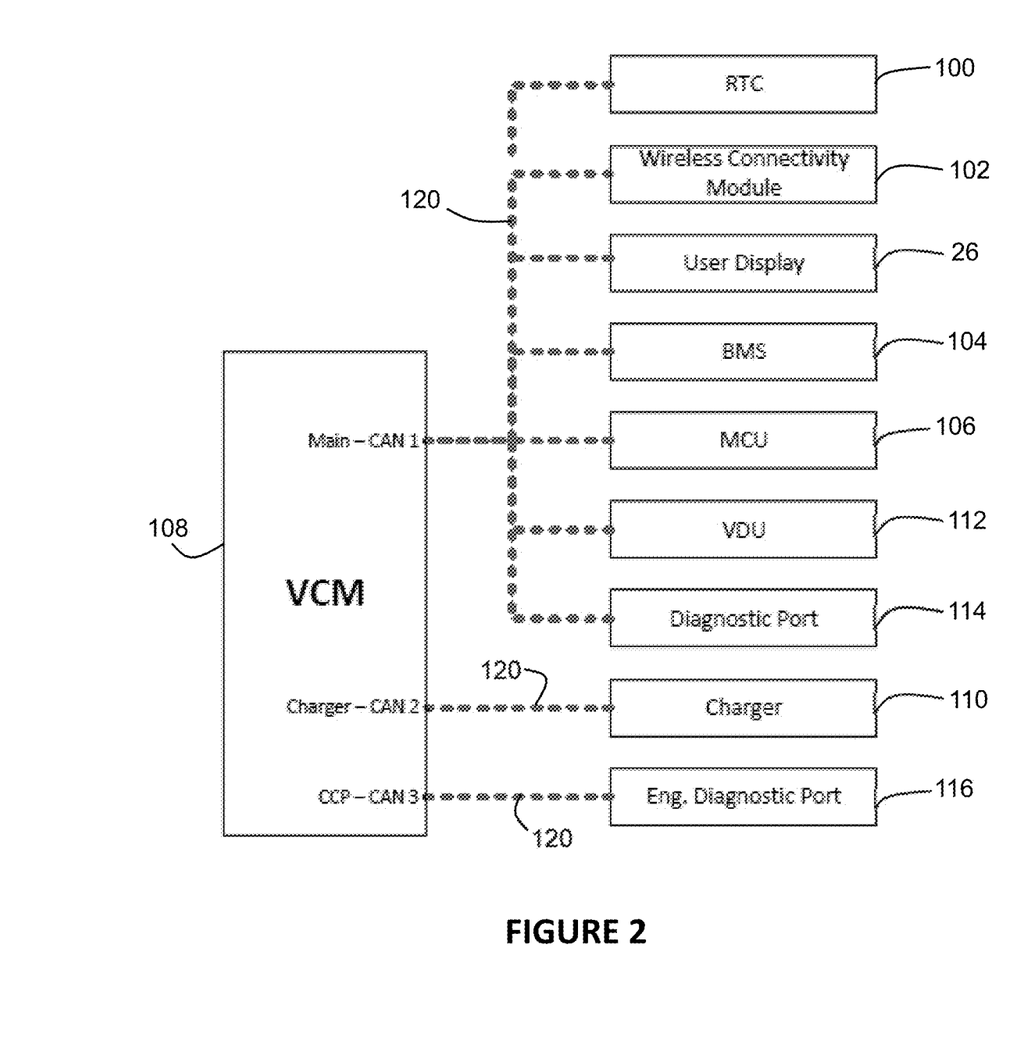
FIG. 2 illustrates a representation of exemplary subsystems of a vehicle control system according to an illustrated embodiment of the subject application.

FIG. 2 illustrates a representation of exemplary subsystems of a vehicle control system 14 according to an illustrated embodiment of the subject application. As shown, according to the illustrated embodiment, the vehicle control system 14 can include, for example, a real time clock (RTC) 100, a wireless connectivity module 102, a user display 26, a battery management system (BMS) or electronic battery control module 104, a motor control unit or motor controller (MCU) 106, an electronic vehicle control module (VCM) 108, a battery charger 110, a visual display unit 112 (VDU), and/or an engine control module/unit (ECU), among other subsystems. As shown in FIG. 2, the VCM 108 can also communicate with a diagnostic port 114 and an engine diagnostic port 116. Such subsystems of the vehicle control system 14 can communicate with each other via a variety of different communication protocols, including, for example, via a common communication bus/protocol. According to certain embodiment, the communication protocol(s) used for such communications by subsystems can be a proprietary communication and/or an industry standard communication, such as, for example, an automotive industry standard based communication, including, but not limited to, LIN, CAN, CAN Calibration Protocol (CCP), and/or FlexRay, among other communication protocols.

Figure 3:
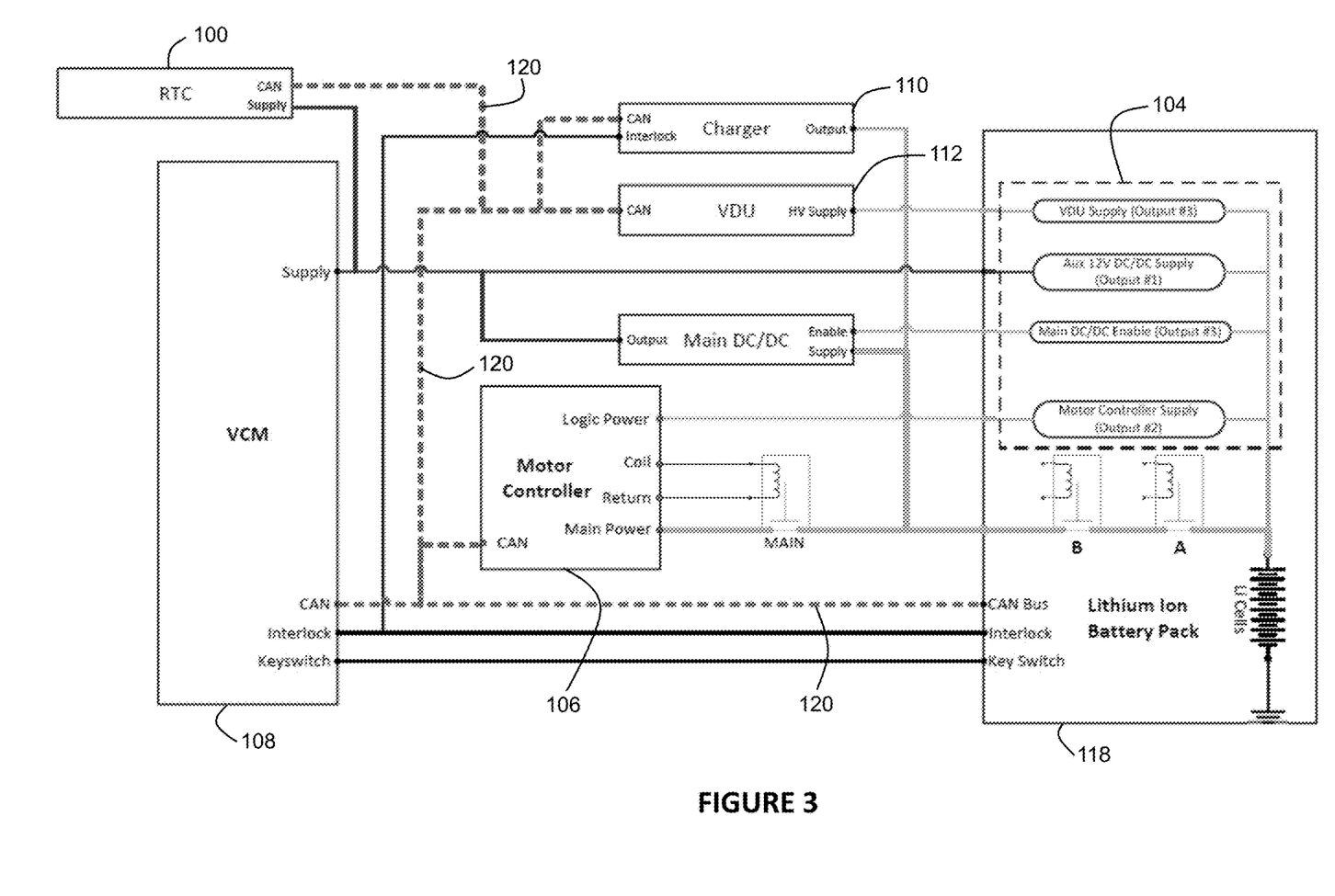
FIGS. 3 and 4 illustrate representations of exemplary architectures of subsystems of vehicle control systems that include an electronic battery control module that is coupled to a lithium ion battery pack.
Figure 4:
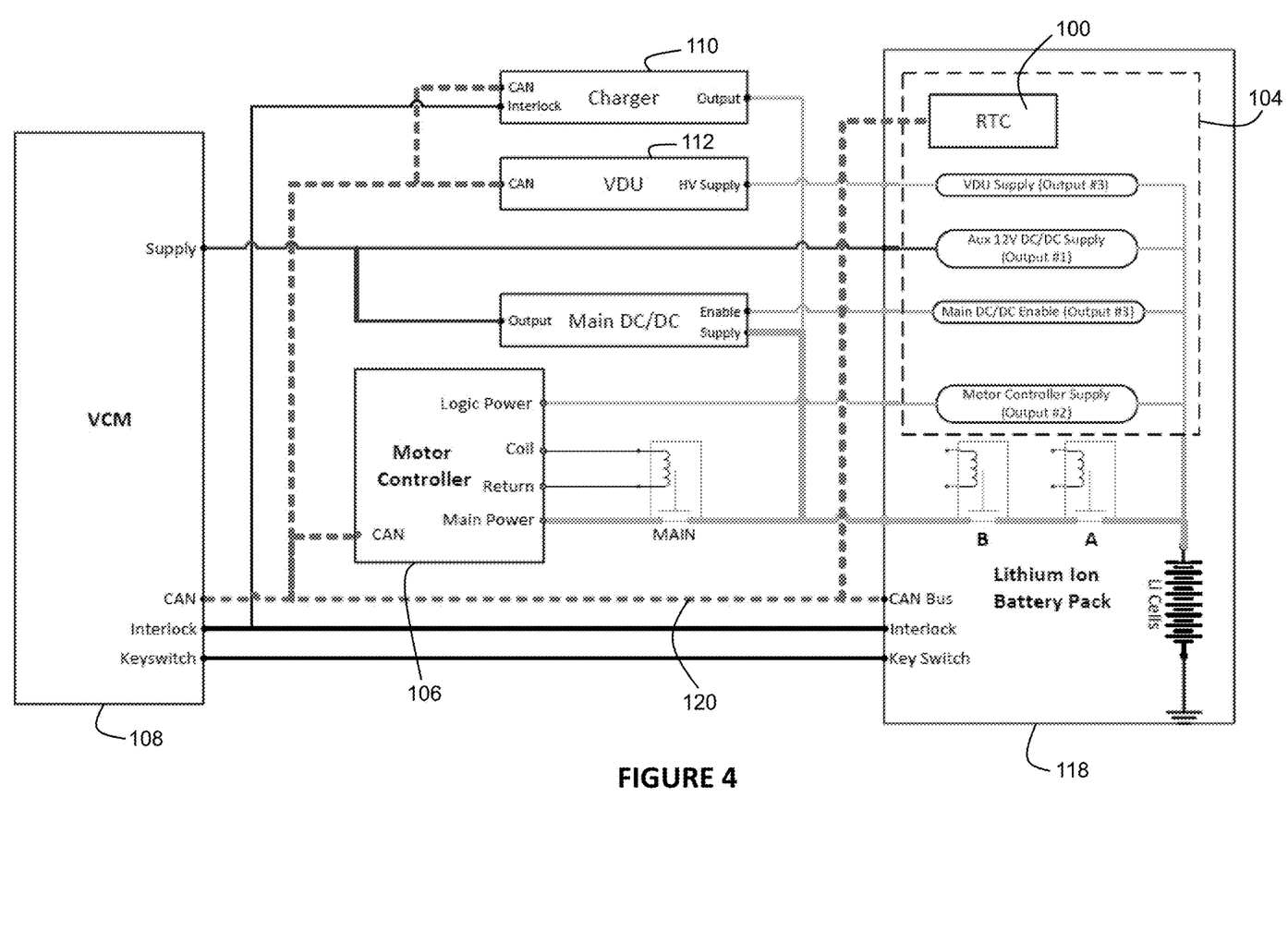
Figure 5A:
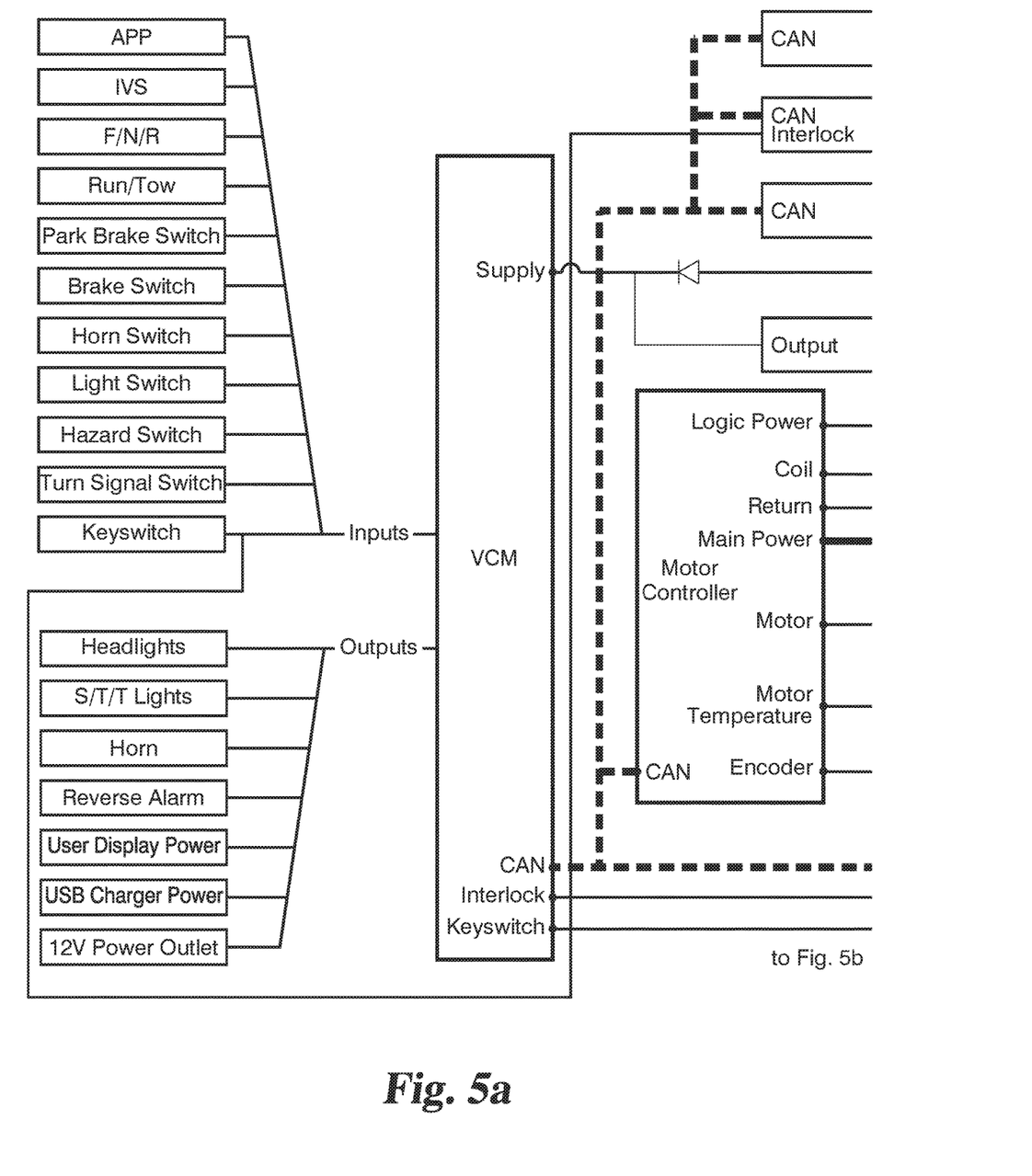
FIGS. 5a and 5b (collectively referred to as FIG. 5) illustrate a representation of an exemplary lithium/AC vehicle control system architecture that includes an electronic battery control module that is coupled to a lithium ion battery pack, and in which a vehicle control module outputs signals for a plurality of DC powered loads.
Figure 5B:
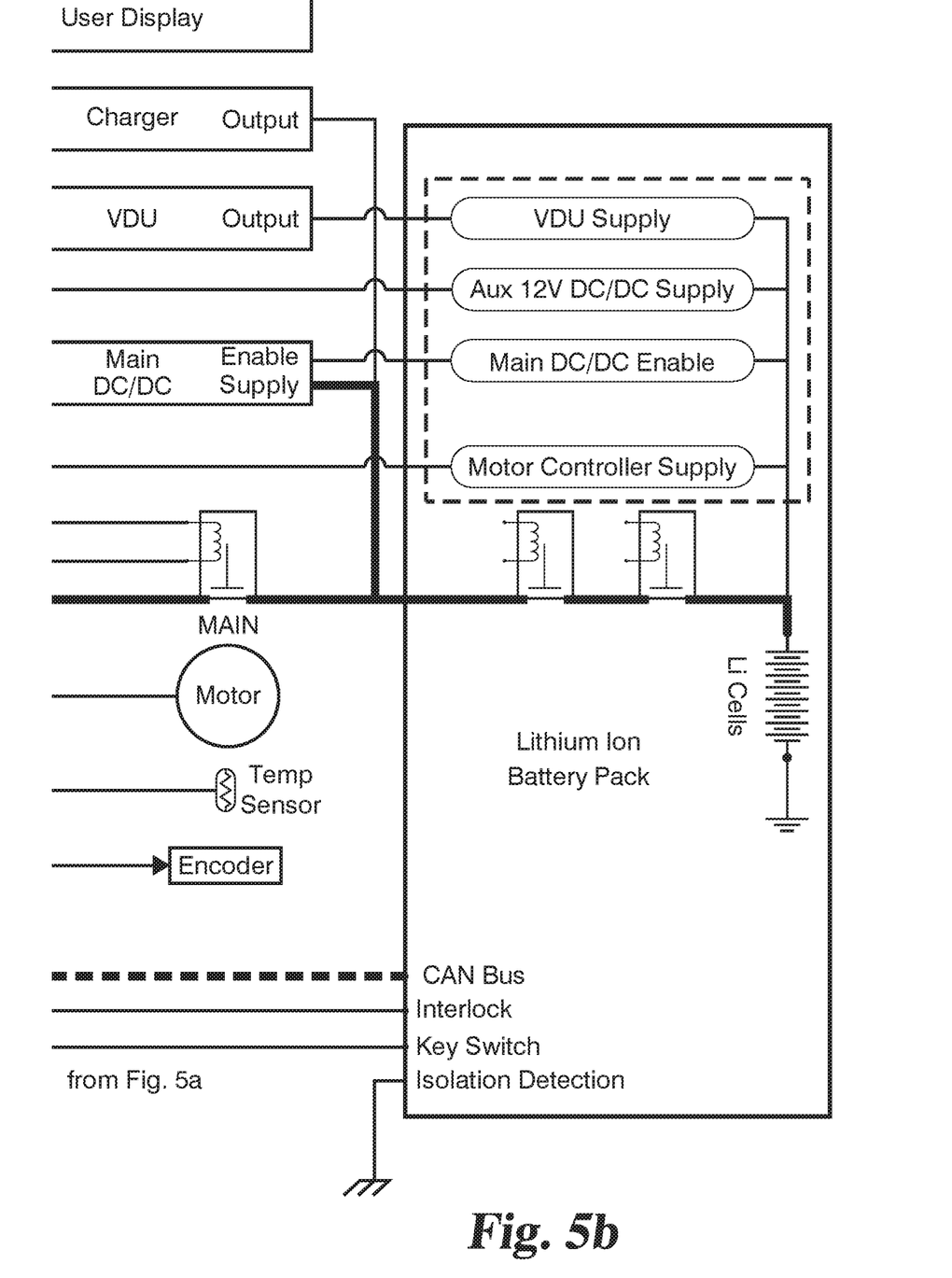
Figure 6A:
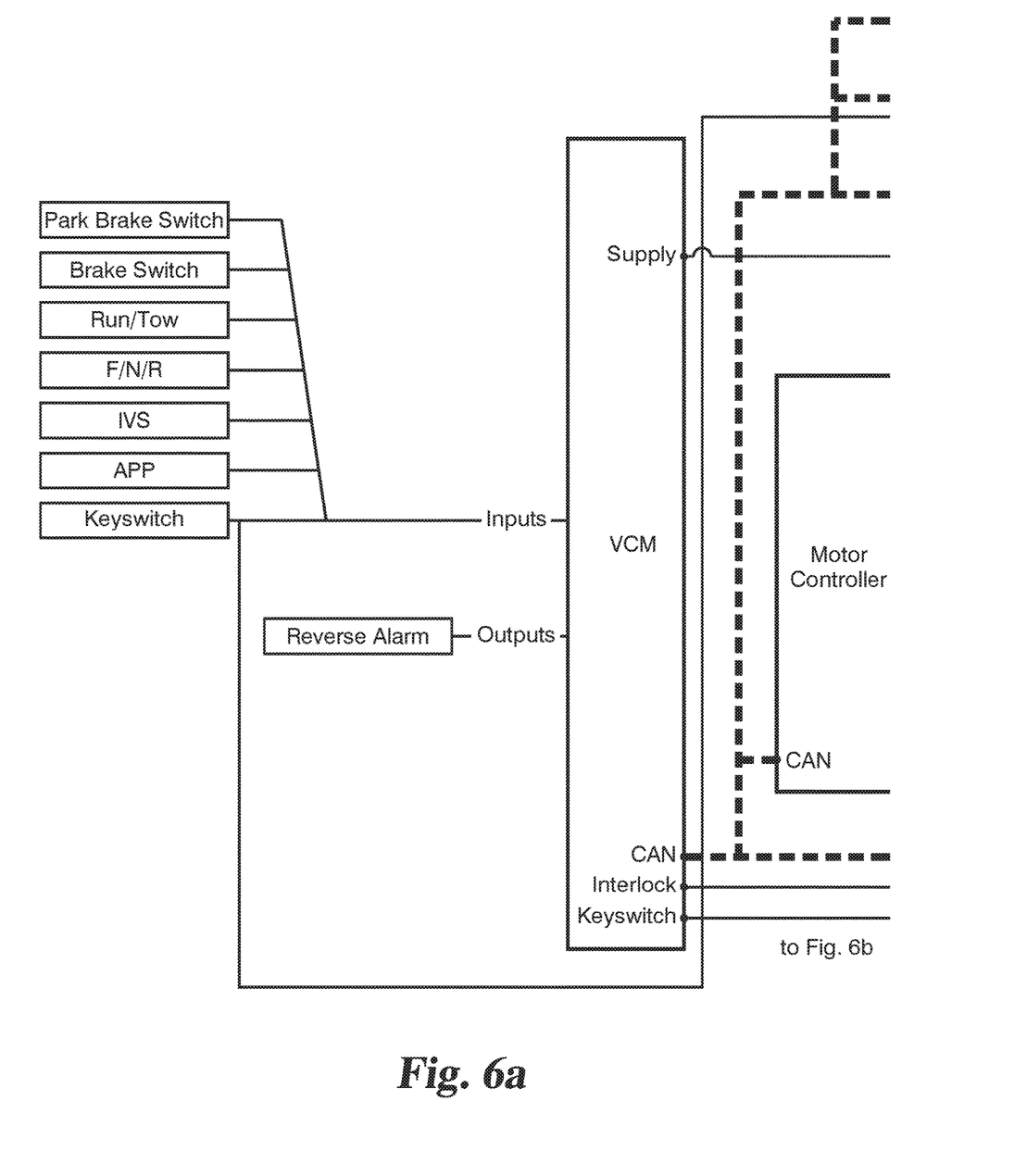
FIGS. 6a and 6b (collectively referred to as FIG. 6) illustrate a representation of an exemplary lithium/AC vehicle control system architecture that includes an electronic battery control module that is coupled to a lithium ion battery pack, and in which a user display receives power via an auxiliary DC/DC converter.
Figure 6B:
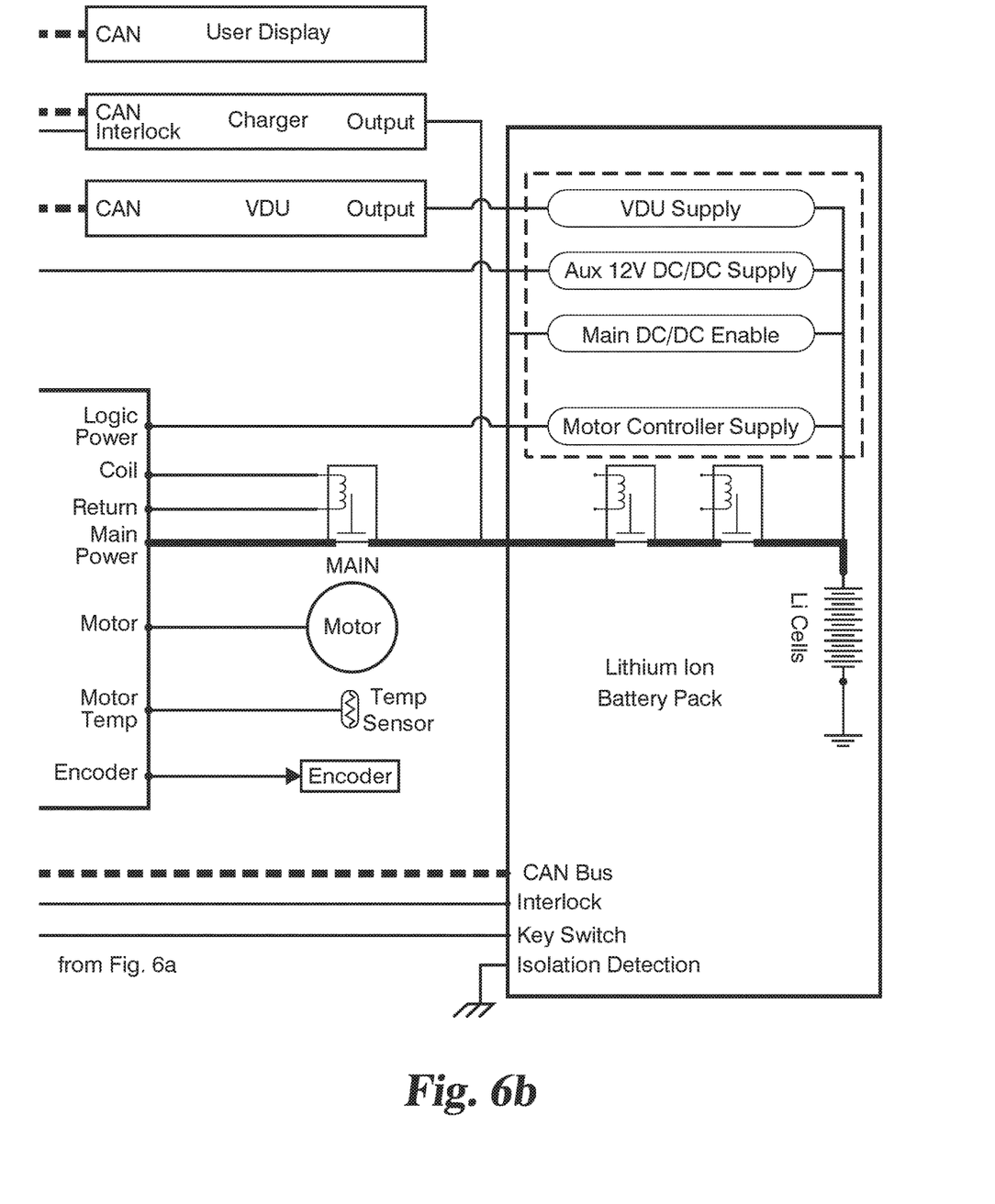

The vehicle control system 14 can include one or more RTC 100. According to certain embodiments, the RTC 100 can be embedded in one or more, if not all, of the control system components, and can be either dedicated electronics or software based. For example, as shown in FIGS. 3 and 5, according to certain embodiments, the RTC 100 may be a separate unit that is in communication with the VCM 108. Alternatively, according to certain embodiments, one or more components of subsystems of the vehicle control system 14 can include, or be individually connected to, an RTC 100. For example, as indicated by FIGS. 4 and 6, according to certain embodiments, one or more of the VCM 108, a battery pack 118, and the BMS 104 can include an RTC 100. Additionally, the RTC 100 included in the vehicle control system 14 can be hardware, an electronic circuit, or software based.

The RTC 100 can be powered in a variety of different manners. For example, as shown by FIG. 3, according to certain embodiments, the RTC 100 can be configured to be powered by electrical power from a main power supply that has been processed so as to be at a voltage and/or a amperage level(s) that are suitable for use by the RTC 100 and/or via power provided by operation of a BMS 104, such as, for example, power provided by a lithium ion battery pack 118. Alternatively, according to certain embodiments, the RTC 100 can have a dedicated power supply, such as, for example, a disposable battery, including, but not limited to, a single cell battery. Additionally, the RTC 100 can be powered in a combination of manners, including, for example, powered by electrical power from a main power source during certain conditions/times, powered via operation of the BMS 104 and/or battery pack 118 during other conditions/times, and/or powered by a dedicated power source, such as, for example, a single cell battery, during certain conditions/times. For example, in the absence of power from a main power supply, the RTC 100 can receive power from the operation of the BMS 104 and/or battery pack 118, such as, for example, the BMS 104 being operated such that the RTC 100 receives power provided by a battery pack 118 having a lithium ion battery, and/or the power can be provided by a dedicated RTC 100 battery. Further, according to embodiments in which the RTC 100 is embedded within a subsystem, such as, for example, the VCM 108 or BMS 104, or is part of a battery pack 118, among other components and subsystems, the RTC 100 can receive a portion of the electrical power that is supplied to, or provided by, that particular subsystem or component. Additionally, according to embodiments in which the vehicle control system 14 includes multiple RTCs 100, one or more RTCs 100 can be powered in a manner that is, at least in part, different than a manner in which another RTC 100 is powered.

The RTC 100 can be configured to provide a time based or representative measurement or indicator. For example, according to certain embodiments, the RTC 100 can provide an indication of an actual time and/or date. The RTC 100 can have a variety of degrees of granularity and/or precision. For example, according to certain embodiments, the RTC 100 can provide one or more increments of time, such as, for example, year, hour, minute, second, and/or nanosecond, as well as any combination thereof, among other increments or measure representative of time. Further, such a date can include, but is not limited to, a day of the week, such as, for example, Monday, and/or a calendar date. Alternatively, the RTC 100 can provide another measurement, such as, for example, a counter that can be synchronized to a reference time or event, including, but not limited to, a time or period of a day, week, and/or month. According to certain embodiments in which the RTC 100 provides real time and/or date, the time and/or date provided by the RTC 100 can be initially set on the manufacturing line of the subsystem using an appropriate communication protocol, at the finished/integrated vehicle level through appropriate diagnostic communication protocols/connections, or through wireless connectivity technology such as, but not limited to, WiFi, Bluetooth, ZigBee, ZWave, etc. Additionally, according to certain embodiments, the RTC 100 can include algorithms to automatically adjust/implement the set time and/or date of the RTC 100 to account for Daylight Savings Time (DST) for those regions in which the utility vehicle 12 is located that that observe DST.

Information provided by the RTC 100 can be used to synchronize components and subsystems of the vehicle control system 14. For example, the VCM 108, which can receive/retrieve information from the RTC 100 using a communication protocol, such as, for example, CAN, among others, can use information from the RTC 100 to synchronize the operation of different subsystems of the vehicle control system 14 to the same time and/or date, which, again, may, or may not, be the actual current time and date. Such synchronization can allow the utility vehicle control system 14 to determine when certain events, such as, for example, time based events that are commenced by the VCM 108 and/or the operation of particular subsystems of the vehicle control system 14, are either enabled/initiated or disabled/terminated. For example, as discussed below, use by the VCM 108 of the information provided by the RTC 100 can enable the vehicle control system 14 to: initiate or terminate time based a charging event(s) for the utility vehicle 12 and/or associated batteries; initiate or terminate time based wake up or shutdown of components of the vehicle control system 14, among other electronic components of the utility vehicle 12; initiate or terminate system status reporting, including, but not limited to, status reporting for the vehicle control system 14 and/or select components thereof; initiate or terminate periodic vehicle level events and maintenance; manage and/or control time based operation of the utility vehicle 12; enable time stamping for events and/or operational usage data of the utility vehicle 12, vehicle control system 14, and/or components thereof; and/or, enable or disable a rear/forward facing camera(s). Additionally, as discussed below, inclusion of the RTC 100 can also facilitate the vehicle control system 14 being configured to time stamp at least events, operation usage data, and/or data pertaining to the operation of the utility vehicle 12 and/or the vehicle control system 14. Further, subsystems or components of the vehicle control system 14 can use information or data from the RTC 100 to time stamp any and all data parameters created, communicated, stored, or transmitted within the vehicle control system 14. This can include, but is not limited to, control messages, commands, acknowledgments, data parameters, fault information, and/or software variables, as well as various combinations thereof. Further, such data can also include both data information internal to the vehicle control system 14, as well as any data information transmitted externally, such as, for example, to a vehicle monitoring system or external device 24.

According to certain embodiments, use by the VCM 108 of the information provided by the RTC 100 can result in the VCM 108 being operated in a manner that can result in the initiation and/or termination of time based charging of the utility vehicle 12, and more specifically, charging of a battery(ies) of the utility vehicle 12 at pre-defined times. For example, according to certain embodiments, information provided/retrieved to/by the VCM 108 from the RTC 100 can be communicated to the battery charger 110 and/or BMS 104 so as to initiate/terminate the charging process. Such initiation/termination of the charging process can be based on a single timed event, or on an unlimited number of timed events. For example, according to certain embodiments, information pertaining to setting the event start time, the end time, and/or the duration of the charging process can be communicated to the VCM 108, such as, for example, via operation by a user of the input/output device 18 and/or an external device(s) 24, and/or may be preprogrammed. Further, information regarding the event start time and the end time for the charging process can be stored within the vehicle control system 14, among other locations, including, for example, within the memory 20.

The vehicle control system 14, such as, for example, the VCM 108, can monitor the RTC 100 to determine if the time provided by the RTC 100 is at, or satisfies, a predetermined or preselected start time for the charging process. If the VCM 108 determines that, based on the time provided by the RTC 100, the time and/or date has reached or is at the predetermined or preselected start time and/or date for the charging process, and the utility vehicle 12 is connected to an external power supply, such as, for example, a utility power supply, then the VCM 108 can issue a signal or command to the battery charger 110 and/or the BMS 104 to begin charging the battery(ies). The VCM 108 can continue to monitor the RTC 100, such as, for example, continuously or at certain intervals, and determine if the time and/or date, as provided by the RTC 100, has reached or is at the predetermined or preselected end time for the charging process. If the time, as provided by the RTC 100, has reached or is at the predetermined or preselected end time for the charging process, the VCM 108 can then issue a signal or command to the battery charger 110 and/or the BMS 104 to terminate the charging process so as to cease charging of the battery(ies) at least via the power provided by the external power supply. Additionally, the initiation and/or termination of charging events can also be time stamped for historical and diagnostic purposes, as discussed below. Additionally, such time stamped information can be stored by the vehicle control system 14, such as, for example, by the memory 20, or in another database, such as, for example, a database associated with the external device 24.

As previously discussed, information provided by the RTC 100 can also be used to initiate and/or terminate time-based wake up or shutdown of one or more components or subsystems of the vehicle control system 14. For example, during times when one or more components or subsystems of the vehicle control system 14 enter into a suspended, idle, or hibernation mode, among other energy saving modes, that can, for example, be associated with periods of non-operational and/or storage of the utility vehicle 12, the vehicle control system 14 can be designed to wake-up all, or, alternatively, singular, components of the vehicle control system 14. According to certain embodiments, such wake-up can be initiated to perform status/health checks on any or all components connected to the vehicle control system 14, including, for example, any or all components connected to one or more communication buses 120 of the vehicle control system 14. Such components that can be subjected to such wake-up can include, but are not limited to, components of the vehicle control system 14, telemetry/telematics components directly connected to the utility vehicle communication bus 120, and/or components connected wirelessly to the vehicle communication bus 120. The vehicle control system 14 can monitor the information and/or data provided by the RTC 100 and initiate the wake-up command at a pre-defined time, including, for example, at a preset time, at predetermined time intervals, and/or predetermined time lapses following initiation of the a period of inactivity.

According to certain embodiments, such wake-up signals can be generated by the VCM 108 and/or the RTC 100, among other possible components of the vehicle control system 14. Additionally, in response to the wake-up signal(s), the vehicle control system 14, or an appropriate subsystem or component, can execute a particular defined system event, before the vehicle control system 14, including, for example, the VCM 108, issues a command to the appropriate system component(s) to return to their previous state, for example to an idle or sleep mode. Additionally, the initiation and/or termination of such a system event, as well as the data collected in association with the event, can be time stamped, such as, for example, via use of information from the RTC 100, for historical and/or diagnostic purposes, as can any other data collected in association with the event. Additionally, such time stamped information can be stored by the vehicle control system 14, such as, for example, by the memory 20, or in another database, such as, for example, a database associated with the external device 24.

During at least certain times of operational use, the vehicle control system 14 can be designed to shut down all, or singular, components or subsystems of the vehicle control system 14. For example, during at least operating conditions, the vehicle control system 14, including, for example, the VCM 108, can initiate shut down of some, if not all, components or subsystems of the vehicle control system 14 so as to conserve energy, including, for example, energy drawn from any or all components connected to the vehicle control system communication bus 120. In particular, such shut down can include, but is not limited to, components of the vehicle control system 14, telemetry/telematics components directly connected to the utility vehicle communication bus 120, and/or components connected wirelessly to the vehicle communication bus 120. According to certain embodiments, such shut down can also be initiated per user-defined parameters that can be stored in components of the vehicle control system 14 and/or in the memory 20. For example, according to certain embodiments, the vehicle control system 14 can be configured to enable automatic shutdown of any and all accessories or the entire utility vehicle 12 after a pre-defined time of inactivity and/or upon execution or completion of a vehicle power down sequence. Further, similar to the previously discussed wake-up commands following the vehicle control system 14, or components thereof being in an idle or sleep modes, following shut down, the vehicle control system 14, including, for example, the VCM 108, can monitor the information and data from the RTC 100 and initiate a wake-up command at a pre-defined time. Additionally, as is also similar to the previously discussed wake-up from a sleep or idle mode, following receipt of the wake-up command, the awoken component(s), subsystem(s), or vehicle control system 14, can execute one or more defined system events before the vehicle control system 14, such as, for example, the VCM 108, issues a signal or command for the appropriate system component(s) or subsystem(s) to return to its/their previous state, such as, for example, the idle or sleep mode. The initiation or termination of such system events, including shutdown, awakening, and execution of a system(s) (and the data associated therewith), and/or the return of the component(s) or subsystem(s) to its/their previous state, can be time stamped, such as, for example, via use of information from the RTC 100, for historical and diagnostic purposes. Additionally, such time stamped information can be stored by the vehicle control system 14, such as, for example, by the memory 20, or in another database, such as, for example, a database associated with the external device 24.

The vehicle control system 14 and its components or subsystems can also be designed to monitor information or data regarding operational status. Such monitored data can include operational use data, operational fault data, and defined communication bus operational data, among other data. Additionally, such monitored operational data can be internally logged/stored by the vehicle control system 14 and/or by the external device 24. According to certain embodiments, such monitored operational data is communicated over a communication bus 120, and is used during real-time computations relating to the operation of the utility vehicle 12, as well in connection with modifications to operational modes. Such monitored operational data can also be reported to a vehicle monitoring system that can be internal or external to the utility vehicle 12. Such reporting can occur at a variety of different times, including, for example, at least at pre-defined time intervals, such pre-defined time intervals that are stored in the vehicle control system 14. Accordingly, the vehicle control system 14, including, for example, the VCM 108, can monitor the RTC 100 and report any or all data stored. Further, data pushed to the vehicle monitoring system can be defined by control system software within components or subsystems of the vehicle control system 14. Similar to other tasks, such monitoring and collection of operation data, as well as any associated reporting or data push, can be time stamped via use of the RTC 100 for historical and diagnostic purposes. Additionally, such time stamped information can be stored by the vehicle control system 14, such as, for example, by the memory 20, or in another database, such as, for example, a database associated with the external device 24.

According to certain embodiments, at least some of the monitored operational data can be pre-categorized based on criticality of operation, maintenance, and safety. Similar to other monitored operational data, such data can also be reported to the vehicle monitoring system at a pre-defined time interval(s) that can be stored in the vehicle control system 14. However, alternatively, such pre-categorize monitored operational data can also be reported immediately to the vehicle monitoring system based on fault level categorization. For example, according to certain embodiments, the severity associated with at least certain pre-categorize monitored operational data can be immediately reported to the vehicle monitoring system so as to facilitate the initiation or termination of certain periodic vehicle level events and/or maintenance of the utility vehicle 12. Additionally, similar to other monitored operational data, such pre-categorize monitored operational data, as well as any associated reporting, data push, and/or related events, can be time stamped via use of the RTC 100 for historical and diagnostic purposes. Additionally, such time stamped information can be stored by the vehicle control system 14, such as, for example, by the memory 20, or in another database, such as, for example, a database associated with the external device 24.

According to certain embodiments, the RTC 100 can also be used in connection with managing and/or controlling time based operation of the utility vehicle 12. Moreover, according to certain embodiments, the vehicle control system 14 can utilize data from the RTC 100 in connection with times being defined and/or selected for operation of the utility vehicle 12. For example, according to certain embodiments, a user or operator of the utility vehicle 12 can set time periods during which the utility vehicle 12 may, or may not, be operated, as well as times associated with the duration of such operation. Moreover, such operational times can define, but are not limited to, duration of operation of the utility vehicle 12 from a start time, period(s) of day and/or day(s) of week for available operation of the utility vehicle 12, such as, for example, setting a time range(s) during a day(s) during which utility vehicle 12 can, or cannot, be operated by a user, such as, for example, driven by a user(s). The user can set such operational settings in a variety of different manners, including, for example, via the input/output device 18, including a touch screen of the display 26, and/or the external device 24. Additionally, such data can be stored in the vehicle control system 14, such as, for example, in the memory 20 and/or by an external device 24. Additionally, the vehicle control system 14, such as, for example, the VCM 108, can monitor the time provided by the RTC 100 to enforce proper control over vehicle operation.

For example, using information provided by the RTC 100, the vehicle control system 14, such as, for example, the VCM 108, can determine whether operation, and/or attempts to operate, the utility vehicle 12 are occurring during a time that is within a preset time for allowed use of the utility vehicle 12, as discussed above, such as for example, a preselected time period during which driving of the utility vehicle 12 is permitted. If such use, or attempted use, of the utility vehicle 12 is determined by the vehicle control system 14 to be within the preset operational time(s), based on at least a comparison of information of the current time provided by the RTC 100 and the stored or recorded data regarding the preset operational time(s) for permissible use, then the vehicle control system 14 can permit the user to operate the utility vehicle 12, such as, for example, drive the utility vehicle 12. If, however, the vehicle control system 14, such as, for example, the VCM 108, determines that the use, or attempted use, of the utility vehicle 12 is not within the stored or recorded preset operational time(s), then the vehicle control system 14 will prohibit and/or terminate such use, or attempted use, of the utility vehicle 12. Additionally, the initiation, attempted initiation, and/or termination of such operation or attempted operation of the utility vehicle 12 can also be time stamped, such as, for example, via information from the RTC 100, for historical and diagnostic purposes, as well as any data collected by such events. Additionally, such time stamped information can be stored by the vehicle control system 14, such as, for example, by the memory 20, or in another database, such as, for example, a database associated with the external device 24.

One aspect of an embodiment of the present application includes an apparatus comprising a utility vehicle having a vehicle control system and at least one real time clock communicatively coupled to the vehicle control system.

A feature of the present application includes the utility vehicle having a lithium ion battery pack.

Another feature of the present application includes the lithium ion battery pack being coupled to a vehicle control module of the vehicle control system.

Still yet another feature of the present application includes the vehicle control system having a charger and a battery management system, the battery management system being coupled to the lithium ion battery pack.

Still another feature of the present application is the vehicle control system does not include any battery source other than the lithium ion battery pack.

A further feature of the present application includes, wherein the at least one real time clock is embedded in the battery storage module.

Another feature of the present application includes wherein the at least one real time clock is embedded in the battery storage module of the vehicle control system.

Another feature of the present application includes the at least one real time clock is embedded in the vehicle control module of the vehicle control system.

Still another feature of the present application is wherein the real time clock is configured to provide at least one of an actual time, actual day of the week, actual day of the year, and the actual calendar year.

Yet another feature of the present application includes wherein the vehicle control system is configured to monitor information or data provided by the real time clock.

Another feature of the present application includes wherein the vehicle control system is configured to store information regarding at least one of a start time and end time for a charging process of a battery of the utility vehicle, the start time being predetermined and representing a time to at least initiate the charging process, the end time being predetermined and representing a time to terminate the charging process.

Yet another feature of the present application includes wherein the vehicle control system is configured to determine, based on information or data provided by the real time clock, whether at least one of the start time for the charging process or the end time for the charging process has arrived.

Another aspect of an embodiment of the present application is a method that comprises storing at least one of a start time and an end time for a charging process in a memory of a vehicle control system of a utility vehicle or an external device that is at least communicatively coupled to the utility vehicle; determining, from information provided by a real time clock of the vehicle control system of the utility vehicle, a current time; determining, by the vehicle control system and via use of the current time from the real time clock, whether the start time for the charging process has arrived; initiating, by the vehicle control system if the start time has arrived, the charging process; determining, by the vehicle control system and via use of the current time from the real time clock, whether the end time for the charging process has arrived; and, terminating, by the vehicle control system if the end time has arrived, the charging process.

Still another feature of the present application includes time stamping, by the vehicle control system and via use of the current time from the real time clock, data of an event associated with at least one of the steps of initiating and terminating the charging process; and recording the event.

Still another feature of the present application includes reporting the event to a vehicle monitoring system.

Another aspect of an embodiment of the present application is a method that includes storing at least one predetermined wake-up time in a memory of a vehicle control system of a utility vehicle or an external device that is at least communicatively coupled to the utility vehicle; determining, from information provided by a real time clock of the vehicle control system of the utility vehicle, a current time; determining, by the vehicle control system and via use of the current time from the real time clock, whether the at least one predetermined wake-up time has arrived; transmitting, by the vehicle control system if the at least one predetermined wake-up time has arrived, a wake-up signal; performing by the vehicle control system, in response transmitting the wake-up signal, at least one check on one or more components of the vehicle control system; and, transmitting, by the vehicle control system and after completion of the at least one check, a signal to return to an idle or sleep mode.

Still another feature of the present application includes time stamping, by the vehicle control system and via use of the current time from the real time clock, data of an event associated with at least one of transmitting the wake-up signal, performance of the at least one check, and transmitting the signal to return to the idle or sleep mode, and recording the event.

Still another feature of the present application includes reporting the event to a vehicle monitoring system.

Another aspect of an embodiment of the present application is a method that includes storing at least one of a start time and an end time for an operational status check for a utility vehicle in a memory of a vehicle control system of the utility vehicle or an external device that is at least communicatively coupled to the utility vehicle; determining, from information provided by a real time clock of the vehicle control system of a the utility vehicle, a current time; determining, by the vehicle control system and via use of the current time from the real time clock, whether the start time for the operational status check has arrived; initiating, by the vehicle control system if the start time has arrived, the operational status check; retrieving the operational data from the operational status check, the operational data including at least one of operational use data, operational fault data, and defined communication bus operational data; determining, by the vehicle control system and via use of the current time from the real time clock, whether the end time for the operational status check has arrived; and terminating, by the vehicle control system if the end time has arrived, the operational status check.

Still another feature of the present application includes time stamping, by the vehicle control system and via use of the current time from the real time clock, an event associated with at least one of the initiation of the operational status check, the termination of the operational status check, and the retrieved operation data, and recording the event.

Still another feature of the present application includes reporting the event to a vehicle monitoring system.

Still another feature of the present application includes the step of pre-categorizing at least some of the operational data based on at least one of criticality of operation, maintenance, and safety, and, adjusting a time for reporting the event based on a determination that the retrieved operational data falls within a pre-categorized class of operational data.

Another aspect of an embodiment of the present application is a method that includes storing at least one of a start time and an end time for permissible vehicle operation in a memory of a vehicle control system of a utility vehicle or an external device that is at least communicatively coupled to the utility vehicle; determining, from information provided by a real time clock of the vehicle control system of the utility vehicle, a current time; determining, by the vehicle control system and via use of the current time from the real time clock, whether the start time for permissible vehicle operation has arrived; permitting, by the vehicle control system if the start time has arrived, operational use of the vehicle, such operational use including ability to drive the utility vehicle; determining, by the vehicle control system and via use of the current time from the real time clock, whether the end time for permissible vehicle operation has arrived; and terminating, by the vehicle control system if the end time has arrived, operational use of the utility vehicle.

Still another feature of the present application includes time stamping, by the vehicle control system and via use of the current time from the real time clock, data of an event associated with at least one of the steps of permitting and terminating operational use of the vehicle; and recording the event.

Still another feature of the present application includes reporting the event to a vehicle monitoring system.

Another aspect of an embodiment of the present application is a method comprising determining, from information provided by a real time clock of a vehicle control system of a utility vehicle, a first current time; determining, by the vehicle control system and using the first current time from the real time clock, whether a start time has arrived for starting an operation that is performed using at least the vehicle control system; initiating, by the vehicle control system if the start time has arrived, the operation; determining, from information provided by the real time clock, a second current time, the second current time being later than the first current time; determining, by the vehicle control system and using the second current time from the real time clock, whether an end time for the operation has arrived; and terminating, by the vehicle control system if the end time has arrived, the operation.

Additionally, a feature of the present application includes time stamping, by the vehicle control system using information provided by the real time clock, data of an event associated with at least one of the steps of initiating and terminating the operation; and recording the event.

Still yet another feature of the present application includes the operation being a charging operation for one or more batteries of the utility vehicle, and further wherein the start time is a time at which the charging operation is to commence, and the end time is another time at which the charging operation is to end.

A further feature of the present application includes wherein the operation is an operational status check for the utility vehicle, and wherein the method further includes retrieving, during the operational status check, operational data, the operational data including at least one of an operational use data, an operational fault data, and a defined communication bus operational data.

Another feature of the present application further includes the steps of pre-categorizing at least some of the operational data based on at least one of the following: criticality of operation, maintenance, and safety; and adjusting a time for the recorded event based on a determination that the retrieved operational data falls within a pre-categorized class of operational data.

Still another feature of the present application includes wherein the start time corresponds to commencement of a period of time for permissible vehicle operation of the utility vehicle, and wherein the end time corresponds to an end of the period of time for permissible vehicle operation of the utility vehicle.

Another aspect of an embodiment of the present application includes determining, from information provided by a real time clock of a vehicle control system of a utility vehicle, a current time; determining, by the vehicle control system using at least the current time from the real time clock, whether at least one predetermined wake-up time has arrived; transmitting, by the vehicle control system if the at least one predetermined wake-up time has arrived, a wake-up signal to one or more components of the vehicle control system; performing, by the vehicle control system in response to transmitting the wake-up signal, at least one status check on the one or more components of the vehicle control system; and transmitting, by the vehicle control system and after completion of the at least one status check, a signal to return the one or more components of the vehicle control system to an idle or sleep mode.

Another feature of the present application further includes the steps of: time stamping, by the vehicle control system using at least information from the real time clock, data of an event associated with at least one of the transmission of the wake-up signal, performance of the at least one status check, and the transmission of the signal to return to the idle or sleep mode; and recording the event.

Another aspect of an embodiment of the present application includes a utility vehicle having a vehicle control system; and at least one real time clock communicatively coupled to the vehicle control system, the vehicle control system configured to take action with respect to an operation performed at least in part by the vehicle control system in response to a current time provided by the at least one real time clock corresponding to a stored predetermined time.

Another feature of the present application includes the stored predetermined time comprising both a start time for the operation and an end time for the operation.

A further feature of the present application includes the vehicle control system comprising a charger and a battery management system, and wherein the apparatus further comprises at least one battery that is electrically coupled to the battery management system, wherein the operation is a charging operation to electrically charge the at least one battery, and wherein the start time is a time at which the charging operation is commence, and the end time is another time at which the charging operation is to end.

Yet another feature of the present application includes the at least one battery comprises a lithium ion battery pack, while another aspect includes the vehicle control system not including any battery source other than the lithium ion battery pack.

Another feature of the present application includes the at least one real time clock being embedded in at least one of a battery storage module of the vehicle control system and a vehicle control module of the vehicle control system.

Still another feature of the present application includes the operation being an operational status check for the utility vehicle, and wherein the vehicle control system is further configured to retrieve, during the operational status check, operational data that includes at least one of an operational use data, an operational fault data, and a defined communication bus operational data.

Yet another feature of the present application includes the operation being a permissible operation of the utility vehicle, and wherein the stored predetermined time comprises both a start time at which permissible operation of the utility vehicle commences, and an end time at which permissible operation of the utility vehicle ends.

Still yet another feature of the present application includes the operation being a transmission of a wake signal, and wherein the stored predetermined time comprises at least a time at which the wake signal is to be transmitted to one or more components of the vehicle control system.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method for utilizing a real time clock of a vehicle control system of a utility vehicle, the method comprising:
   determining, from information provided by the real time clock of the vehicle control system of the utility vehicle, a first current time;
   determining, by the vehicle control system and using the first current time from the real time clock, whether a start time has arrived for starting an operation that is performed using at least the vehicle control system, the operation being a charging operation for one or more batteries of the utility vehicle;
   initiating, by the vehicle control system if the start time has arrived, the operation by transmitting, from the vehicle control system to a charger of the utility vehicle, an initiation signal that causes the charger to begin charging the one or more batteries of the utility vehicle;
   determining, from information provided by the real time clock, a second current time, the second current time being later than the first current time;
   determining, by the vehicle control system and using the second current time from the real time clock, whether an end time for the operation has arrived; and
   terminating, by the vehicle control system if the end time has arrived, the operation by transmitting, from the vehicle control system to the charger of the utility vehicle, termination signal that causes the charger to end the charging of the one or more batteries of the utility vehicle.

2. The method of claim 1, further comprising:
   time stamping, by the vehicle control system using information provided by the real time clock, data of an event associated with at least one of initiating and terminating the operation; and
   recording the event.

3. The method of claim 1, wherein the start time is a time at which the charging operation is to commence, and the end time is another time at which the charging operation is to end.

4. The method of claim 1, wherein the operation is a first operation, the start time is a first start time, the method further comprising:
   determining, by the vehicle control system and using a third current time determined from information provided the real time clock, whether a second start time has arrived for starting a second operation that is performed using at least the vehicle control system, the second operation being an operational status check for the utility vehicle, and wherein the method further includes retrieving, during the operational status check, operational data, the operational data including at least one of an operational use data, an operational fault data, and a defined communication bus operational data.

5. The method of claim 4, further comprising:
   time stamping, by the vehicle control system using at least information from the real time clock, an event associated with at least one of the initiation of the operational status check, the termination of the operational status check, and the retrieved operation data; and
   recording the event.

6. The method of claim 5, further comprising:
   pre-categorizing at least some of the retrieved operational data based on at least one of the following: criticality of operation, maintenance, and safety; and
   adjusting a time for the recorded event based on a determination that the retrieved operational data falls within a pre-categorized class of the retrieved operational data.

7. The method of claim 1, wherein the start time is a first start time, and the end time is a first end time, the method further comprising:
   determining, by the vehicle control system and using a third current time determined from information provided the real time clock, whether a second start time has arrived that corresponds to commencement of a period of time for permissible vehicle operation of the utility vehicle; and
   determining, by the vehicle control system and using a fourth current time determined from information provided by the real time clock, whether a second end time has arrived that corresponds to an end of the period of time for the permissible vehicle operation of the utility vehicle.

8. The method of claim 7, further comprising:
   time stamping, by the vehicle control system using at least information from the real time clock, an event associated with at least one of the commencement of the period of time for the permissible vehicle operation of the utility vehicle and the end of the period of time for the permissible vehicle operation of the utility vehicle; and
   recording the event.

9. A method for utilizing a real time clock of a vehicle control system of a utility vehicle, the method comprising:
   determining, from information provided by the real time clock of the vehicle control system of the utility vehicle, a current time;
   determining, by the vehicle control system using at least the current time from the real time clock, whether at least one predetermined initiation time has arrived;
   transmitting, by the vehicle control system if the at least one predetermined initiation time has arrived, an initiation signal to a charger of the vehicle control system;
   performing, by the vehicle control system in response to transmitting the initiation signal, a charging process for one or more batteries of the utility vehicle via the charger; and
   transmitting, by the vehicle control system, a termination signal to the charger of the vehicle control system, the termination signal being configured to terminate the charging process.

10. The method of claim 9, further comprising:
   time stamping, by the vehicle control system using at least information from the real time clock, data of an event associated with at least one of the transmission of the initiation signal, performance of the charging process, and the transmission of the termination signal; and
   recording the event.

11. The method of claim 9, wherein the current time is a first current time, the method further comprising:
   determining, by the vehicle control system using at least a second current time determined from additional information provided by the real time clock, whether at least one predetermined wake-up time has arrived;
   transmitting, by the vehicle control system if the at least one predetermined wake-up time has arrived, a wake-up signal to one or more components of the vehicle control system; and
   performing, by the vehicle control system in response to transmitting the wake-up signal, at least one status check on the one or more components of the vehicle control system.

12. A utility vehicle configured to utilize a real time clock, the utility vehicle comprising:
   a vehicle control system comprising a charger and a battery management system;
   at least one battery that is electrically coupled to the battery management system; and
   at least one real time clock communicatively coupled to the vehicle control system, the vehicle control system configured to take action with respect to an operation performed at least in part by the vehicle control system in response to a current time provided by the at least one real time clock corresponding to a stored predetermined time, wherein the operation is a charging operation to electrically charge the at least one battery.

13. The utility vehicle of claim 12, wherein the stored predetermined time comprises both a start time for the operation and an end time for the operation.

14. The utility vehicle of claim 13, wherein the start time is a time at which the charging operation is commence, and the end time is another time at which the charging operation is to end.

15. The utility vehicle of claim 12, wherein the at least one battery comprises a lithium ion battery pack.

16. The utility vehicle of claim 15, wherein the vehicle control system does not include any battery source other than the lithium ion battery pack.

17. The utility vehicle of claim 12, wherein the at least one real time clock is embedded in at least one of a battery storage module of the vehicle control system and a vehicle control module of the vehicle control system.

18. The utility vehicle of claim 12, wherein the operation is a first operation and the stored predetermined time is a first stored predetermined time, the vehicle control system being configured to take action with respect to a second operation performed at least in part by the vehicle control system in response to the current time provided by the at least one real time clock corresponding to a second stored predetermined time, the second operation being an operational status check for the utility vehicle, and wherein the vehicle control system is further configured to retrieve, during the operational status check, operational data that includes at least one of an operational use data, an operational fault data, and a defined communication bus operational data.

19. The utility vehicle of claim 12, wherein the operation is a first operation and the stored predetermined time is a first stored predetermined time, the vehicle control system being configured to take action with respect to a second operation performed at least in part by the vehicle control system in response to the current time provided by the at least one real time clock corresponding to a second stored predetermined time, the second operation being a permissible operation of the utility vehicle, and wherein the stored predetermined time comprises both a start time at which the permissible operation of the utility vehicle commences, and an end time at which the permissible operation of the utility vehicle ends.

20. The utility vehicle of claim 12, wherein the operation is a first operation and the stored predetermined time is a first stored predetermined time, the vehicle control system being configured to take action with respect to a second operation performed at least in part by the vehicle control system in response to the current time provided by the at least one real time clock corresponding to a second stored predetermined time, the second operation being a transmission of a wake signal, and wherein the stored predetermined time comprises at least a time at which the wake signal is to be transmitted to one or more components of the vehicle control system.

* * * * *